United States Patent
Lin

(10) Patent No.: US 11,153,633 B2
(45) Date of Patent: Oct. 19, 2021

(54) GENERATING AND PRESENTING DIRECTIONAL BULLET SCREEN

(71) Applicant: Shanghai Bilibili Technology Co., Ltd., Shanghai (CN)

(72) Inventor: Xiaoshan Lin, Shanghai (CN)

(73) Assignee: Shanghai Bilibili Technology Co., Ltd., Shanghai (CN)

(*) Notice: Subject to any disclaimer, the term of this patent is extended or adjusted under 35 U.S.C. 154(b) by 33 days.

(21) Appl. No.: 16/204,774

(22) Filed: Nov. 29, 2018

(65) Prior Publication Data

US 2019/0166394 A1  May 30, 2019

(30) Foreign Application Priority Data

Nov. 30, 2017  (CN) .......................... 201711245822.6

(51) Int. Cl.
  *G06F 3/0484* (2013.01)
  *H04N 21/431* (2011.01)
  (Continued)

(52) U.S. Cl.
  CPC ..... *H04N 21/4312* (2013.01); *H04N 21/4788* (2013.01); *H04N 21/47217* (2013.01); *H04N 21/4884* (2013.01); *H04N 21/8456* (2013.01)

(58) Field of Classification Search
  CPC ............ H04N 21/4312; H04N 21/431; H04N 21/4788; H04N 21/8456; H04N 21/845;
  (Continued)

(56) References Cited

U.S. PATENT DOCUMENTS 7,809,773 B2  10/2010  Horowitz et al.
8,019,815 B2   9/2011  Keener et al.
(Continued)

FOREIGN PATENT DOCUMENTS

CN  102780921 A  11/2012
CN  104487967 A   4/2015
(Continued)

OTHER PUBLICATIONS

Hu, M., Zhang, M., & Luo, N. (Sep. 2016). Understanding participation on video sharing communities: The role of self-construal and community interactivity. Computers in Human Behavior, 62, 105-115. (Year: 2016).*

(Continued)

*Primary Examiner* — Linda Huynh
(74) *Attorney, Agent, or Firm* — BakerHostetler

(57) ABSTRACT

Techniques for generating and presenting comments relative to video frames among a selected group of users in a network community are described herein. The disclosed techniques include receiving message data comprising at least one comment on a video item from a user; determining that the at least one comment is restricted to be viewable by a selected group of users based on an input by the user via an interface; determining whether user information associated with the first user satisfies at least one predetermined condition; and generating a directional bullet screen based on determining that the user information associated with the first user satisfies the at least one predetermined condition. The directional bullet screen is restricted to be accessible by the selected group of users and presents a plurality of comments relative to a plurality of video frames. The at least one comment relative to at least one frame of the video item is presented to and viewable by the selected group of users via the directional bullet screen.

12 Claims, 8 Drawing Sheets

(51) Int. Cl.
*H04N 21/4788* (2011.01)
*H04N 21/845* (2011.01)
*H04N 21/488* (2011.01)
*H04N 21/472* (2011.01)

(58) Field of Classification Search
CPC ........... H04N 21/47217; H04N 21/472; H04N 21/4884
See application file for complete search history.

(56) References Cited

U.S. PATENT DOCUMENTS

| | | | |
|---|---|---|---|
| 8,376,910 B2 | 2/2013 | Cheung et al. | |
| 8,545,369 B2 | 10/2013 | Cheung et al. | |
| 8,555,177 B1 | 10/2013 | Junee et al. | |
| 8,628,414 B2 | 1/2014 | Walker et al. | |
| 8,701,153 B2 | 4/2014 | Abrams | |
| 8,909,740 B1* | 12/2014 | Bliss | G06F 1/12 709/219 |
| 9,003,306 B2 | 4/2015 | Mehin et al. | |
| 9,253,225 B1 | 2/2016 | Junee et al. | |
| 9,332,315 B2 | 5/2016 | Agrawal | |
| 9,467,408 B1 | 10/2016 | Sherman-Presser et al. | |
| 2003/0233361 A1* | 12/2003 | Cady | H04L 67/14 |
| 2005/0078668 A1* | 4/2005 | Wittenberg | H04L 12/2856 370/389 |
| 2008/0059986 A1* | 3/2008 | Kalinowski | H04N 21/8355 725/1 |
| 2009/0249223 A1 | 10/2009 | Barsook et al. | |
| 2009/0300475 A1* | 12/2009 | Fink | H04N 21/4781 715/230 |
| 2012/0331496 A1 | 12/2012 | Copertino et al. | |
| 2013/0297691 A1* | 11/2013 | Collins | G06F 16/9535 709/204 |
| 2013/0302005 A1* | 11/2013 | Harwell | H04N 21/2408 386/200 |
| 2013/0326352 A1 | 12/2013 | Morton | |
| 2014/0012910 A1 | 1/2014 | White | |
| 2014/0013200 A1 | 1/2014 | White | |
| 2014/0081435 A1 | 3/2014 | Wagner | |
| 2014/0089801 A1 | 3/2014 | Agrawal | |
| 2014/0092127 A1 | 4/2014 | Kruglick | |
| 2015/0082342 A1 | 3/2015 | Norwood et al. | |
| 2015/0261853 A1 | 9/2015 | Shao | |
| 2016/0316272 A1 | 10/2016 | Li | |
| 2016/0342287 A1 | 11/2016 | Barker et al. | |
| 2016/0366466 A1* | 12/2016 | Shen | H04N 21/431 |
| 2017/0251240 A1* | 8/2017 | Peng | H04N 21/8153 |
| 2017/0289634 A1* | 10/2017 | E | H04N 21/4316 |
| 2018/0041796 A1* | 2/2018 | Huang | H04N 21/4788 |
| 2019/0200078 A1* | 6/2019 | Bhattacharya | G06F 40/30 |

FOREIGN PATENT DOCUMENTS

| | | | | |
|---|---|---|---|---|
| CN | 104956357 A | | 9/2015 | |
| CN | 104980809 A | * | 10/2015 | |
| CN | 104980809 A | | 10/2015 | |
| CN | 105187933 A | * | 12/2015 | |
| CN | 105187933 A | | 12/2015 | |
| CN | 105451088 A | * | 3/2016 | |
| CN | 105451088 A | | 3/2016 | |
| CN | 105956200 A | * | 9/2016 | |
| CN | 106792237 A | * | 5/2017 | |
| JP | 2012-029064 A | | 2/2012 | |
| JP | 5809122 B2 | | 11/2015 | |
| WO | WO-2017206909 A1 | * | 12/2017 | ........... H04N 21/442 |

OTHER PUBLICATIONS

Zhang, Yi, "Heteroglossic Chinese Online Literacy Practices on Micro-Blogging and Video-Sharing Sites" (Apr. 7, 2017). Graduate Theses and Dissertations, http://scholarcommons.usf.edu/etd/6788 (Year: 2017).*
Bilibili Help (Jun. 18, 2014). Barrage mode. Retrieved from https://web.archive.org/web/20140618204431/http://www.bilibili.com/html/help.html#d1 (machine translation attached) (Year: 2014).*
Bilibili Help (Jun. 18, 2014). Barrage cap. Retrieved from https://web.archive.org/web/20140618204431/http://www.bilibili.com/html/help.html#d2 (machine translation attached) (Year: 2014).*
Yan et al. Machine translation of CN 105451088A (attached to end of CN105451088A), retrieved Nov. 3, 2020 from https://worldwide.espacenet.com/ (Year: 2016).*
Shi et al. Machine translation of CN104980809A (attached to end of CN104980809A), retrieved Nov. 3, 2020 from https://worldwide.espacenet.com/ (Year: 2015).*
Liu et al. Machine translation of CN105187933A (attached to end of CN105187933A), retrieved Nov. 3, 2020 from https://worldwide.espacenet.com/ (Year: 2015).*
Xiao et al. Machine translation of CN106792237A (attached to end of CN106792237A), retrieved Nov. 7, 2020 from https://worldwide.espacenet.com/ (Year: 2017).*
Li et al. Machine translation of WO2017206909A1 (attached to end of WO2017206909A1), retrieved Nov. 3, 2020 from https://worldwide.espacenet.com/ (Year: 2017).*

* cited by examiner

GENERATING AND PRESENTING DIRECTIONAL BULLET SCREEN

CROSS-REFERENCE TO RELATED APPLICATION

The present application claims priority of Chinese patent application No. 201711245822.6, filed on Nov. 30, 2017. The entire disclosure of the above-identified application is hereby incorporated by reference herein and made a part of this specification.

BACKGROUND

Users may attempt to access conventional social media on their devices to communicate about interesting content. Using conventional social media may be cumbersome as users may have to switch back and forth between different applications to access the content of interest and social media related to the content. As communication devices, such as mobile phones, become more sophisticated, people continue to discover new ways to communicate.

BRIEF DESCRIPTION OF THE DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

DETAILED DESCRIPTION OF ILLUSTRATIVE EMBODIMENTS

Figure 1:
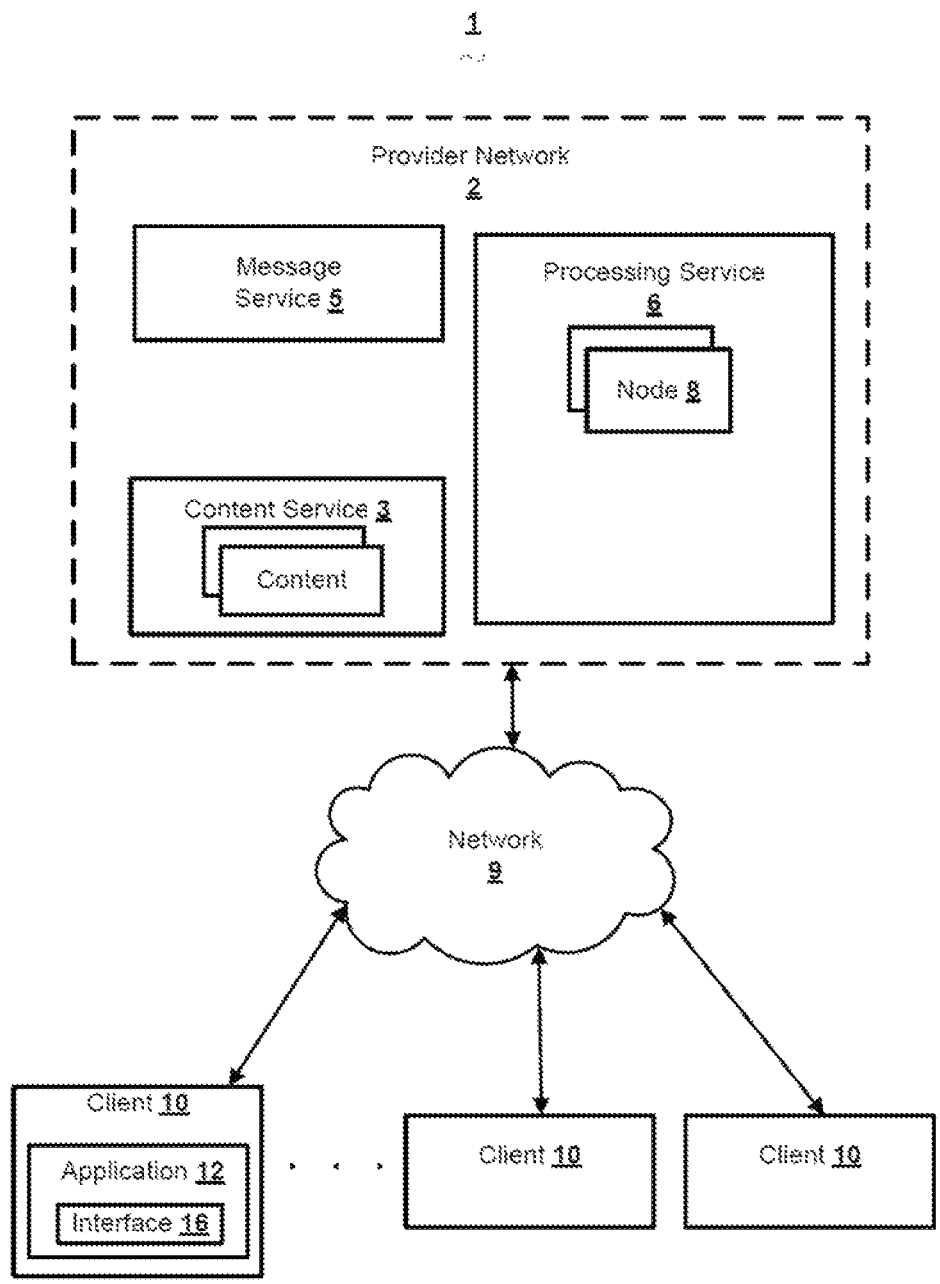
FIG. 1 is a schematic diagram illustrating an example system that may be used in accordance with the present disclosure.

FIG. 1 is a schematic diagram showing an example system 1 that may be used in accordance with the present disclosure. The system 1 may comprise a provider network 2 and a plurality of client devices 10. The provider network 2 and the plurality of client devices 10 may communicate with each other via one or more networks 9.

In some embodiments, the content service 3 may be implemented as part of the provider network 2. In other embodiments, the content service 3 may be managed by a separate service provider than a service provider of the provider network 2. It should also be understood that the provider network 2 may provide additional content services separate from the content service 5.

The content service 3 may comprise a content streaming service, such as an Internet protocol video streaming service. The content streaming service may be configured to distribute content via a variety of transmission techniques. The content service 3 may be configured to provide the content, such as video, audio, textual data, a combination thereof, and/or the like. The content may comprise content streams (e.g., video stream, audio stream, information stream), content files (e.g., video file, audio file, text file), and/or other data. The content may comprise gaming content. For example, the content service 5 may comprise a collaborative gaming platform, a video sharing service, a video hosting platform, a content distribution platform, and/or the like.

The provider network 2 may implement a commentary service configured to allow users to comment and/or share comments associated with content. The comments may be displayed with the content on the same screen. For example, the comments may be displayed in an overlay above the content. The comments may be encoded into a format of the content. For example, the comments may be encoded as video content as the original content. The comments may be animated when displayed. For example, the comments may be shown scrolling (e.g., from right to left, left to right, top to bottom, bottom to top) across the content, which may be referred to as "bullet screen."

The provider network 2 may be located at a data center, such as a single premises, or be distributed throughout different geographic locations (e.g., at several premises). The provider network 2 may provide the services via the one or more networks 9. The networks 9 comprise a variety of network devices, such as routers, switches, multiplexers, hubs, modems, bridges, repeaters, firewalls, proxy devices, and/or the like. The networks 9 may comprise physical links, such as coaxial cable links, twisted pair cable links, fiber optic links, a combination thereof, and/or the like. The networks 9 may comprise wireless links, such as cellular links, satellite links, Wi-Fi links and/or the like.

The provider network 2 may comprise a message service 5. The message service 5 may be configured to receive a plurality of messages. The plurality of messages may comprise a plurality of comments associated with content and information related to the plurality of comments. The plurality of messages may be associated with a particular content item, content session, and/or the like.

The message service 5 may be configured to manage messages for various content items. Users may browse content and access different content items to view comments for particular content, such as comments posted by other users for that particular content. Comments from users associated with a particular content item may be output to other users watching the particular content item. For example, all users accessing a content item (e.g., video clip) may view comments associated with the content item. Comments that are input may be output in real-time or near-real-time.

The message service 5 may be configured to process the plurality of messages. The message service 5 may implement a queue or otherwise prioritize processing of the plurality messages based on information, e.g., time stamps, incremented identifier, associated with corresponding comments. The message service 5 may be configured to process the plurality of messages using load balancing. For example, the message service 5 may be configured to use one or more of the plurality of processing nodes to process the messages, prioritize the messages, load balance the messages, and/or the like. The message service 5 may store, at least temporarily, the plurality of messages. The message service 5 may store the messages in a datastore, such as a database.

The message service 5 may be configured to process a message by performing a grouping process. The grouping process may comprise grouping messages based on a characteristic. If two messages have the same characteristic or are within a threshold range of a characteristic, then the messages may be grouped. Messages associated with a particular content item (e.g., stream, file, show, movie, song, game session) may be associated with the same group. For example, a message may comprise or be associated with a content identifier. The content identifier may uniquely identify the content item. The message service 5 may associate a message with a group associated with the content item if the content identifier is found in the message or otherwise associated with the message (e.g., sent separately).

The message service 5 may perform natural language processing, topic recognition, pattern recognition, artificial intelligence, and/or the like to automatically determine characteristics of the messages and/or group the messages. As an example, frequently occurring phrases or patterns may be identified as topics. As another example, a database of topics associated with content may be maintained. The topics may include genres (e.g., action, drama, comedy), personalities (e.g., actors, actresses, directors), languages, and/or the like. Messages may be grouped based on characteristics of the client device and/or users sending the messages. Demographics, interests, history, and/or like may be stored for a plurality of users to determine potential groupings of messages.

The message service 5 may be configured to process messages by determining contexts for outputting (e.g., displaying, presenting) comments comprised in the messages. The context may comprise a context for outputting a comment based on the grouping. The context may comprise a time context associated with a time to output the comment.

A message may indicate a time when a comment was input by a user. The time may comprise a time internal to the content item or other similar information, such as fragment identifiers. For example, the time may indicate a portion of the content item (e.g., one or more content fragments) that was viewed by a user when the user input a comment. The time may indicate when a user started inputting the comment, a duration of inputting, a time when the input was submitted, and/or the like.

The message service 5 may determine to output a comment during or close to the portion of content item being commented. In an example, if multiple messages are received for a portion of time (e.g., a scene), then a time offset may be added to some of the messages to prevent all of corresponding comments from being output at the same time.

The context may further comprise a graphical context associated with a form of the comment. The graphical context may comprise a size, a color, a font, and/or the like. The context may comprise a moving context in which the comment moves when output. The moving context may comprise an animation. For example, the moving context may comprise a direction of movement (e.g., left to right, right to left, up to down, down to up, diagonally). The moving context may comprise any type of animation, such as a spinning motion, a waving motion, a zig-zag, a circular motion, increasing in size, decreasing in size, and/or the like.

The context may be determined based on a preference associated with a message. For example, a user may specify a preference for how a corresponding comment is to be output. The user may specify the context for a particular comment. The context may be determined based on a characteristic of a particular content item. For example, the graphical context may be determined based on the background color of the content item during a particular segment. The graphical context may contrast with the background color of the content item.

The message service 5 may be further configured to process a message by generating output data. The output data may comprise instructions for implementing outputting a comment based on corresponding context. The output data may comprise application data for instructing an application to overlay the comment based on the context. The output data may comprise instructions for generating (e.g., encoding) content corresponding to a comment.

The output data may be used to generate (e.g., encode) output commentary content, such as an output content stream. The output commentary content may be combined (e.g., multiplexed) with original content item such as the content provided by the content service 3. The resulting combination may comprise content in a single package (e.g., container, transport container, transport stream). The package may comprise the original content item along with the output commentary content (e.g., displayed on top of the original content item).

The message service 5 may be further configured to process messages by performing a screening process. The screening process may comprise rejecting or flagging messages that match screening criteria. The screening criteria may specify terms and/or phrases, such as profanity, hate speech, indecent language, and/or the like. The screening criteria may specify characters, such as symbols, fonts, and/or the like. The screening criteria may specify languages, computer readable code patterns, and/or the like.

The provider network 2 may further comprise a processing service 6. The processing service 6 may be configured to provide processing for a variety of services, such as the services of the provider network 2. The processing service 6 may comprise a plurality of processing nodes 8 (e.g., as a service). The plurality of processing nodes 8 may process tasks associated with a message service 5. The plurality of processing nodes 8 may be implemented as one or more computing devices, one or more processors, one or more virtual computing instances, a combination thereof, and/or the like.

The plurality of processing nodes 8 may be implemented by one or more computing devices. The one or more computing devices may comprise virtualized computing instances. The virtualized computing instances may comprise a virtual machine, such as an emulation of a computer system, operating system, server, and/or the like. A virtual machine may be loaded by a computing device based on a virtual image and/or other data defining specific software (e.g., operating systems, specialized applications, servers) for emulation. Different virtual machines may be loaded and/or terminated on the one or more computing devices as the demand for different types of processing services changes. A hypervisor may be implemented to manage the use of different virtual machines on the same computing device.

The plurality of processing nodes 8 may comprise nodes associated with providing specific services (e.g., processing tasks). The nodes may be dedicated to providing these specific services. For example, the plurality of processing nodes 8 may implement a receiver, a content generator, a combiner, a transcoder, a combination thereof.

In some embodiments, the plurality of processing nodes 8 may process events submitted by the plurality of client computing devices. The events may be associated with discussing real-time news, videos, social hot topics, reports against certain user accounts, and/or the like. In other embodiments, the plurality of processing nodes 8 may process performance evaluation for a plurality of user account who review events in the network community. In some implementations, these services may be implemented as dedicated computing devices, dedicated processors, dedicated virtual machine instances, and/or the like. In other implementations, a variety of different nodes may implement any of the functions associated with these services.

The plurality of client devices 10 may be configured to access the content and the services of the provider network 2. The plurality of client devices 10 may comprise any type of computing device, such as a mobile device, a tablet device, laptop, a computing station, a smart device (e.g., smart apparel, smart watch, smart speaker, smart glasses), a virtual reality headset, a gaming device, a set top box, digital streaming device, robot, a vehicle terminal, a smart TV, a TV box, an e-book reader, MP3 (Moving Picture Experts Group Audio Layer III) players, MP4 (Moving Picture Experts Group Audio Layer IV) players, and so on.

The plurality of client devices 10 may be associated with one or more users. A single user may use one or more of the plurality of client devices 10 to access the provider network 2. The plurality of client devices 10 may travel to a variety of locations and use different networks to access the provider network 2.

An example client device 10 may comprise an application 12. The application 12 outputs (e.g., display, render, present) content to a user. The content may comprise videos, audio, comments, textual data and/or the like. The application 12 may also provide a menu for navigating a variety of content.

The client device 10 may access an interface 16 that allows users to provide comments associated with corresponding content and submit events to a processing service. The interface 16 may comprise an input element. For example, the input element may be configured to receive input from a user, such as comments associated with a particular content, events, user accounts, and/or the like. In some embodiments, the interface 16 may be implemented as part of the application 12.

The application 12 may allow a user to set a context (e.g., color, font size, animation, emoji, scrolling direction) associated with his or her input. The application 132 may determine (e.g., automatically) other context information, such as timing information (e.g., start time, duration, end time for the input). The application 12 may send the input, the context, the context information, and/or other information to the message service 5 of the provider network 2.

The application 12 may also send events to a processing service. As an example, the application 12 may send reports against certain users to a processing service, and the application 12 may also send reviews about the reports to the processing service. The events or reviews sent from the plurality of client computing devices comprise reasons of submitting the events, content attributes associated with the events, user account information, and/or the like. The techniques for processing events and evaluating performance of a plurality of user accounts in accordance with the present disclosure can be implemented by the example system as shown in FIG. 1.

Figure 2:
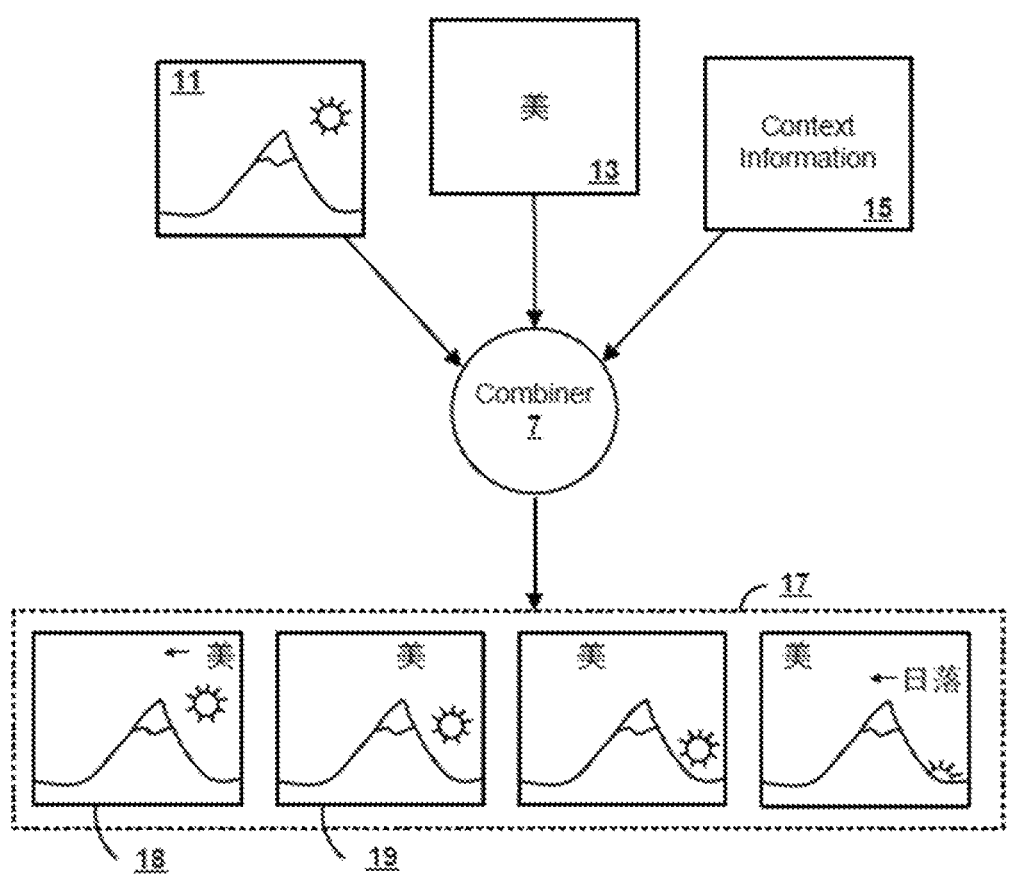
FIG. 2 is a schematic diagram illustrating an example process for combining content that may be used in accordance with the present disclosure.

FIG. 2 is a schematic diagram showing an example process for combining content. A combiner 7 may be configured to receive content 11. As illustrated in this example, the content 11 may comprise a video. It should be understood that other content may be used. The content 11 may comprise a plurality of frames, such as a series of images. The plurality of frames may be time ordered. For example, a first frame may be ordered before a second frame.

The combiner 7 may be implemented by any of the services and/or devices described herein. For example, the combiner 7 may be implemented by the processing service 6 or the message service 5 of the provider network 2. In other examples, the combiner 7 may be implemented by the application 12 of the client devices 10.

The combiner 7 may be configured to receive message data 13 associated with the content 11. The message data 13 may comprise one or more characters. As illustrated in this example, shown in FIG. 2, a Chinese character is shown. It should be understood, that the message data 13 may comprise multiple characters, symbols, and/or like in one or more languages. For example, the message data 13 may comprise comments from users associated with the content 11.

The combiner 7 may be further configured to receive context information 15. The context information 15 may indicate a context for rendering the message data 13 associated with the content 11. The context information 15 may comprise timing information indicating a time to render the message data 13 with the content 11. The context information 15 may comprise a start time associated with the message data, a scrolling speed, a font size, a font color, an end time associated with the message data, and/or other relevant information.

The combiner 7 may be configured to combine the content 11 and the message data 13 to generate combined content 17 based on the context information 15. The combiner 7 may combine the content 11 and the message data 13 by generating a content package. The content package may comprise a container, such as a transport container (e.g., MPEG transport or other transport container), a formatted container (e.g., as specified for an encoding format). The content package may comprise instructions for a rendering engine to render the content 11 and the message data 13 at least partially together.

As shown in FIG. 2, the combiner 7 may combine the content 11 and the message data 13 by generating a modified video. For example, at least a portion of the message data may be added to the plurality of frames. The message data may be animated separately from the video and/or may be combined with (e.g., overlain, inserted into, added to, associated with, encoded into) frames of the video.

Using the content information, positions (e.g., relative to the plurality of frames) for the message data (e.g., characters) may be determined for one or more (or each) of the plurality of frames. A first position may be determined for a first frame 18. A second position may be determined for the second frame 19. The second position may be different than the first position. The second position may be determined based on the first position.

For example, a path for rendering characters of the message data may be determined. The path may specify a direction for animating and/or scrolling text above the content 11. The direction may vary. For example, the path may be curvilinear. The second position may be further along the path than the first position (e.g., if the second frame is after the first frame in the time ordering). If the path is from right to left, as shown in FIG. 2, then the second position may be further left than the first position. The combiner 7 may combine the content 11 and the message data 13 in a manner that the message data 13 is successively rendered along the path as the plurality of frames of the content progress.

Though only one character is shown, the combiner 7 may be configured to receive message data from a variety of sources at any time and combine the message data 13 with the content 11. For example, message data 13 from a plurality of users may be received and combined with the content 11. Different message data 13 may be combined in a manner that the message data 13 is rendered at least partially simultaneously.

For example, several messages from different users (e.g., another user may comment "日落" or sunset) may be rendered at least partially at the same time with the content 11. The message data may be combined in a manner that allows for the content 11 to remain viewable during rendering of the message data. For example, the message data may be combined with the content 11 using constraints that limit the number of messages shown simultaneously, limit the location of message data (e.g., shown in areas where pixels have less change, shown in background areas of the content), and/or the like as described further herein. As an example, the message data may be shown in a background, such as the sky behind a mountain in the example of FIG. 2. In other embodiments, the message data are not received as a series of messages, but rather the messages are combined and rendered by a separate service. In such an embodiment, the messages are not separately identifiable by the combiner 7 but rather are received as, e.g., a video overlay.

Figure 3:
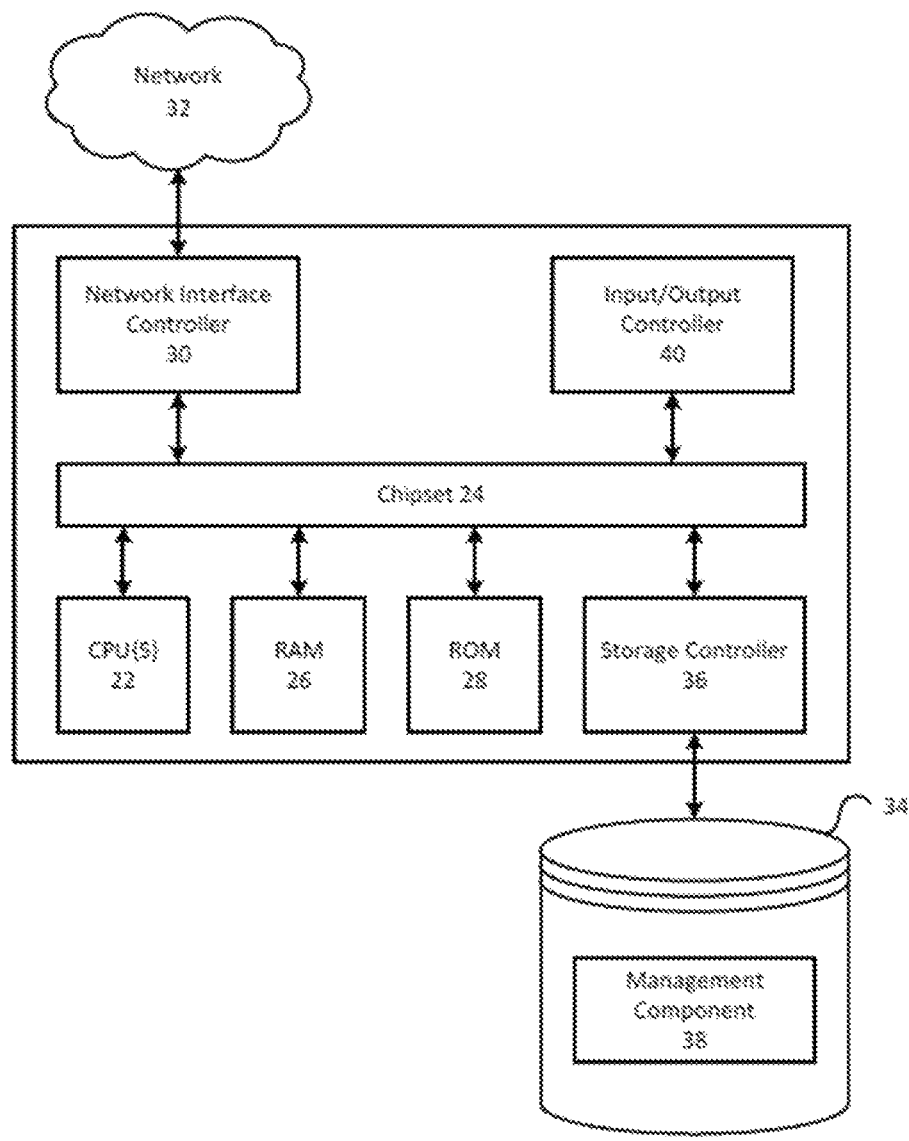
FIG. 3 is a schematic diagram illustrating an example computing device that may be used in accordance with the present disclosure.

FIG. 3 depicts a computing device that may be used in various aspects, such as the services, networks, and/or clients depicted in FIG. 1. With regard to the example architecture of FIG. 1, the message service, content service, processing service, provider network, and client may each be implemented by one or more an instances of a computing device 20 of FIG. 3. The computer architecture shown in FIG. 3 shows a conventional server computer, workstation, desktop computer, laptop, tablet, network appliance, PDA, e-reader, digital cellular phone, or other computing node, and may be utilized to execute any aspects of the computers described herein, such as to implement the methods described herein.

The computing device 20 may include a baseboard, or "motherboard," which is a printed circuit board to which a multitude of components or devices may be connected by way of a system bus or other electrical communication paths. One or more central processing units (CPUs) 22 may operate in conjunction with a chipset 24. The CPU(s) 22 may be standard programmable processors that perform arithmetic and logical operations necessary for the operation of the computing device 20.

The CPU(s) 22 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 22 may be augmented with or replaced by other processing units, such as GPU(s). The GPU(s) may comprise processing units specialized for but not necessarily limited to highly parallel computations, such as graphics and other visualization-related processing.

A chipset 24 may provide an interface between the CPU(s) 22 and the remainder of the components and devices on the baseboard. The chipset 24 may provide an interface to a random access memory (RAM) 26 used as the main memory in the computing device 20. The chipset 24 may further provide an interface to a computer-readable storage medium, such as a read-only memory (ROM) 28 or non-volatile RAM (NVRAM) (not shown), for storing basic routines that may help to start up the computing device 20 and to transfer information between the various components and devices. ROM 28 or NVRAM may also store other software components necessary for the operation of the computing device 20 in accordance with the aspects described herein.

The computing device 20 may operate in a networked environment using logical connections to remote computing nodes and computer systems through local area network (LAN). The chipset 24 may include functionality for providing network connectivity through a network interface controller (NIC) 30, such as a gigabit Ethernet adapter. A NIC 30 may be capable of connecting the computing device 20 to other computing nodes over a network 32. It should be appreciated that multiple NICs 30 may be present in the computing device 20, connecting the computing device to other types of networks and remote computer systems.

The computing device 20 may be connected to a mass storage device 34 that provides non-volatile storage for the computer. The mass storage device 34 may store system programs, application programs, other program modules, and data, which have been described in greater detail herein. The mass storage device 34 may be connected to the computing device 20 through a storage controller 36 connected to the chipset 24. The mass storage device 34 may consist of one or more physical storage units. The mass storage device 34 may comprise a management component 38. A storage controller 36 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 20 may store data on the mass storage device 34 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 34 is characterized as primary or secondary storage and the like.

For example, the computing device 20 may store information to the mass storage device 34 by issuing instructions through a storage controller 36 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 20 may further read information from the mass storage device 34 by detecting the physical states or characteristics of one or more particular locations within the physical storage units.

In addition to the mass storage device 34 described above, the computing device 20 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 20.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A mass storage device, such as the mass storage device 34 depicted in FIG. 3, may store an operating system utilized to control the operation of the computing device 20. The operating system may comprise a version of the LINUX operating system. The operating system may comprise a version of the WINDOWS SERVER operating system from the MICROSOFT Corporation. According to further aspects, the operating system may comprise a version of the UNIX operating system. Various mobile phone operating systems, such as IOS and ANDROID, may also be utilized. It should be appreciated that other operating systems may also be utilized. The mass storage device 34 may store other system or application programs and data utilized by the computing device 20.

The mass storage device 34 or other computer-readable storage media may also be encoded with computer-executable instructions, which, when loaded into the computing device 20, transforms the computing device from a general-purpose computing system into a special-purpose computer capable of implementing the aspects described herein. These computer-executable instructions transform the computing device 20 by specifying how the CPU(s) 22 transition between states, as described above. The computing device 20 may have access to computer-readable storage media storing computer-executable instructions, which, when executed by the computing device 20, may perform the methods described herein.

A computing device, such as the computing device 20 depicted in FIG. 3, may also include an input/output controller 40 for receiving and processing input from a number of input devices, such as a keyboard, a mouse, a touchpad, a touch screen, an electronic stylus, or other type of input device. Similarly, an input/output controller 40 may provide output to a display, such as a computer monitor, a flat-panel display, a digital projector, a printer, a plotter, or other type of output device. It will be appreciated that the computing device 20 may not include all of the components shown in FIG. 3, may include other components that are not explicitly shown in FIG. 3, or may utilize an architecture completely different than that shown in FIG. 3.

As described herein, a computing device may be a physical computing device, such as the computing device 20 of FIG. 3. A computing node may also include a virtual machine host process and one or more virtual machine instances. Computer-executable instructions may be executed by the physical hardware of a computing device indirectly through interpretation and/or execution of instructions stored and executed in the context of a virtual machine.

Figure 4:
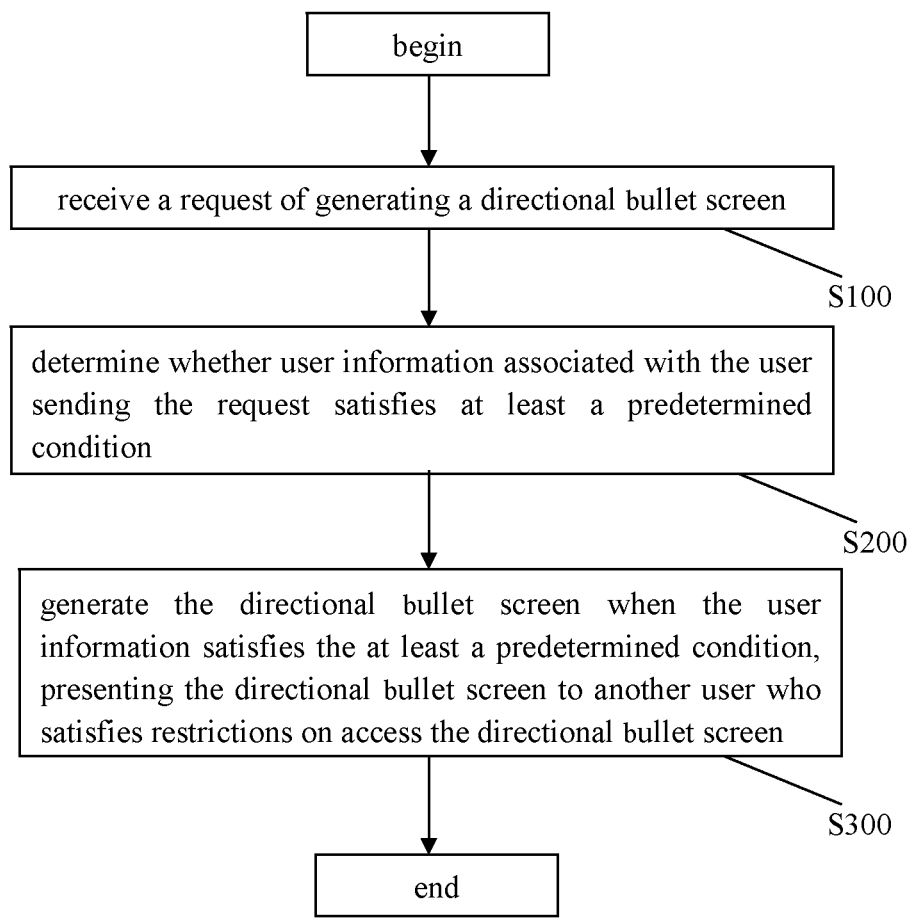
FIG. 4 is a flowchart illustrating an example process of an embodiment of the present disclosure.

FIG. 4 is a flowchart illustrating a preferred embodiment of the bullet screen playing control method of the present invention, in this embodiment, the bullet screen playing control method comprises the following steps:

S100: receiving a creation request of objective directional bullet screen;

When a user is watching a video on a video website, when there is a need for some comments to be privatized or grouped, he sends a creation request of objective directional bullet screen which can be viewed only by a group of definite people to the interactive interface of the video website. Therefore, in the present invention, a new-type bullet screen playing mode is usually executed by a single request of the user. According to the creation request of the user, the video website operator will create an independent bullet screen platform for the user to play the objective directional bullet screen.

S200: judging whether the user information of the user sending the objective directional bullet screen satisfies a preset creation condition or not;

For the bullet screen is added for the independence and personalization requirements, the user who sends the creation request can be authenticated and when the user information of the user satisfies the creation condition preset by the video website operator, the creation of the objective directional bullet screen can be allowed. For example, the membership can be set for all users, and the users need to register and log on the video website to become members of the video website to send the creation request, and as another example, the hierarchy can be set for the member users, and when and only when the level of the user is larger than a preset level threshold, the creation request can be sent, and so on.

S300: creating a bullet screen platform when the user information satisfies the creation condition, and playing the objective directional bullet screen to another user entering into the bullet screen platform.

The user information is audited, and when the user information satisfies the creation condition, a bullet screen platform exclusively belonging to the user can be created for the user sending the objective directional bullet screen, then at this time, the user will be the manager of the bullet screen platform, and can control the users entering into the bullet screen platform, and the benefit of the bullet screen platform is that, a part of the bullet screen sent by the user can be chosen to be the objective directional bullet screen, that is, when other users who do not enter into the bullet screen platform are watching a video, only the public bullet screen is being played in the video display interface, only the users who enter into the bullet screen platform will receive the objective directional bullet screen, then the bullet screen will be divided into multiple categories according to the user's requirements, which increases privacy and directivity.

Figure 5:
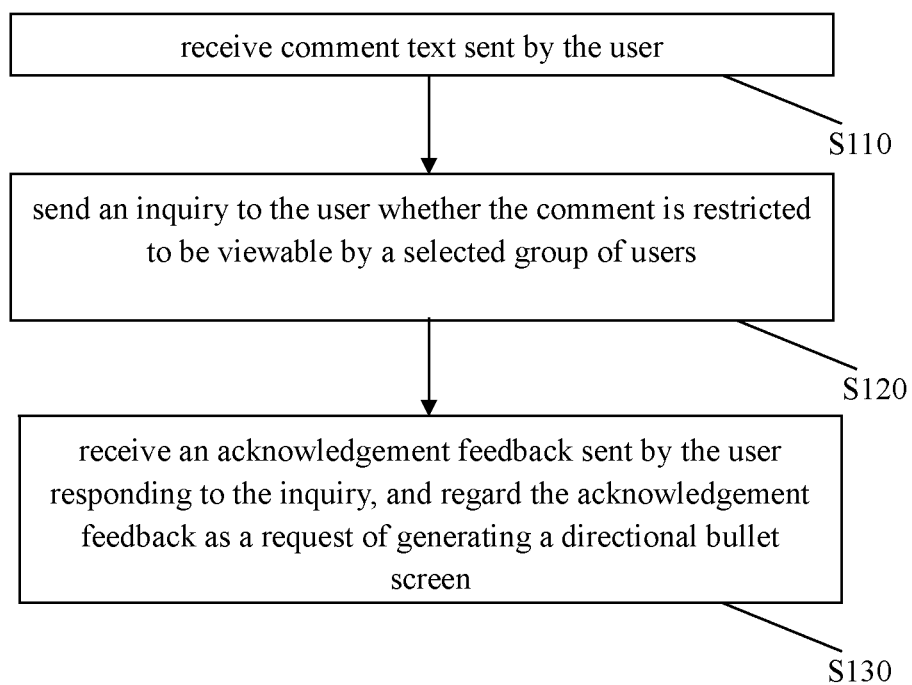
FIG. 5 is a flowchart illustrating an example process of the step S100 that may be used in accordance with the present disclosure.

FIG. 5 is a flowchart illustrating an example process of the step S100 shown in FIG. 4. As shown in FIG. 5, the process that the user sends the creation request can be carried out according to the following steps:

S110: receiving bullet screen text sent by the user;

S120: sending an inquiry to the user that whether the bullet screen corresponding to the bullet screen text needs to be transformed into the objective directional bullet screen or not;

S130: receiving an acknowledgement feedback sent by the user responding to the inquiry, and regarding the acknowledgement feedback as the creation request.

In the above steps, when the user sends bullet screen text to the video watched, an inquiry interface can be ejected to the user to ask the user whether the bullet screen corresponding to the bullet screen text needs to be transformed into objective directional bullet screen or not, through the setting of the inquiry mechanism, on the one hand, the user can be reminded the creation of the bullet screen that is neglected or forgotten by the user and requires a part of people to watch, on the other hand, as to the video website operator, the user consumption points can be increased to bring benefits to him. Once the user acknowledges that the bullet screen needs to be transformed, the user's acknowledgement feedback is regarded as the creation request of the objective directional bullet screen, then the subsequent steps are executed.

Figure 6:
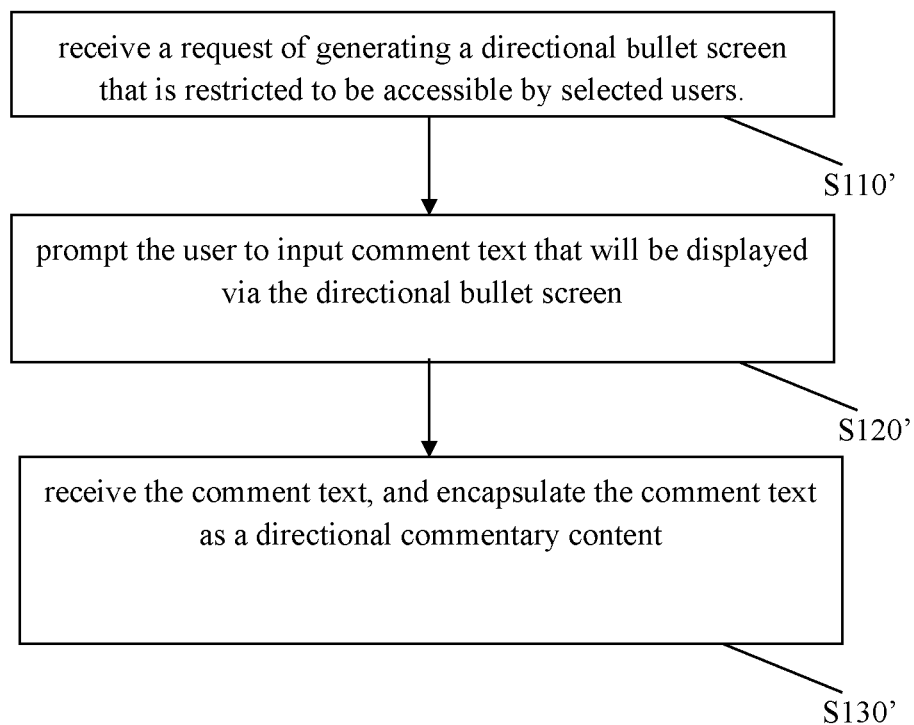
FIG. 6 is a flowchart illustrating another example process of the step S100 that may be used in accordance with the present disclosure.

FIG. 6 is a flowchart illustrating another example process of the step S100 shown in FIG. 4. As shown in FIG. 6, the process that the user sends the creation request can be carried out according to another set of the following steps:

S110': receiving a request of creating the bullet screen platform sent by the user;

S120': prompting the user to input the objective directional bullet screen that will be displayed on the bullet screen platform;

S130': receiving bullet screen text input by the user, and encapsulating the bullet screen text as the objective directional bullet screen.

In this embodiment, when the user does not send bullet screen, he first sends a request of creating a bullet screen platform to the video website operator, after the video website operator receives the request, the video website operator prompts the user to input objective directional bullet screen that will be played to a specific group of people, after the user inputs bullet screen text, the bullet screen text is encapsulated as objective directional bullet screen, and the bullet screen text is played to the specific group of people in the subsequent bullet screen platform.

It can be understood that between the step S110' and the step S120', the user information of the user can be judged first, that is, the steps S200 and S300 are carried out in priority, and only when the user is authenticated, he can input the objective directional bullet screen text. The above steps are optional, and can be adjusted according to the business requirements, the server configuration and so on of the video website operators.

In another preferred or optional embodiment, the step S200 of judging whether the user information of the user sending the objective directional bullet screen satisfies a preset creating condition or not includes:

presetting the creation condition in a server;

extracting the user information of the user, wherein, the user information includes: the account level of the user, the attribute of the user and the platform point of the user;

comparing the user information with the creation condition.

The purpose of the above configuration is to preset a creation condition for creating a bullet screen platform before the user sends the request of the objective directional bullet screen to the video website operator, that is, only the specified user or the user that meets certain requirements can create the bullet screen platform, the user differentiation and the user consumption points are increased by dividing users. Specifically, the creation condition preset win the server is stored as a creation threshold, when the user information of the user who sends the creation request of the objective directional bullet screen is extracted, when and only when the user's account level is higher than, for example, the 5th level, the 10th level, etc., and/or the user's attribute is a quarter member, an annual member, a permanent member, etc., and/or the user's platform point on the video website is larger than a certain preset value, such as 500, 1000, etc., and/or any other information related to the operation of the video website and capable of being regarded as a comparison object, the user will be allowed to create the bullet screen platform.

Figure 7:
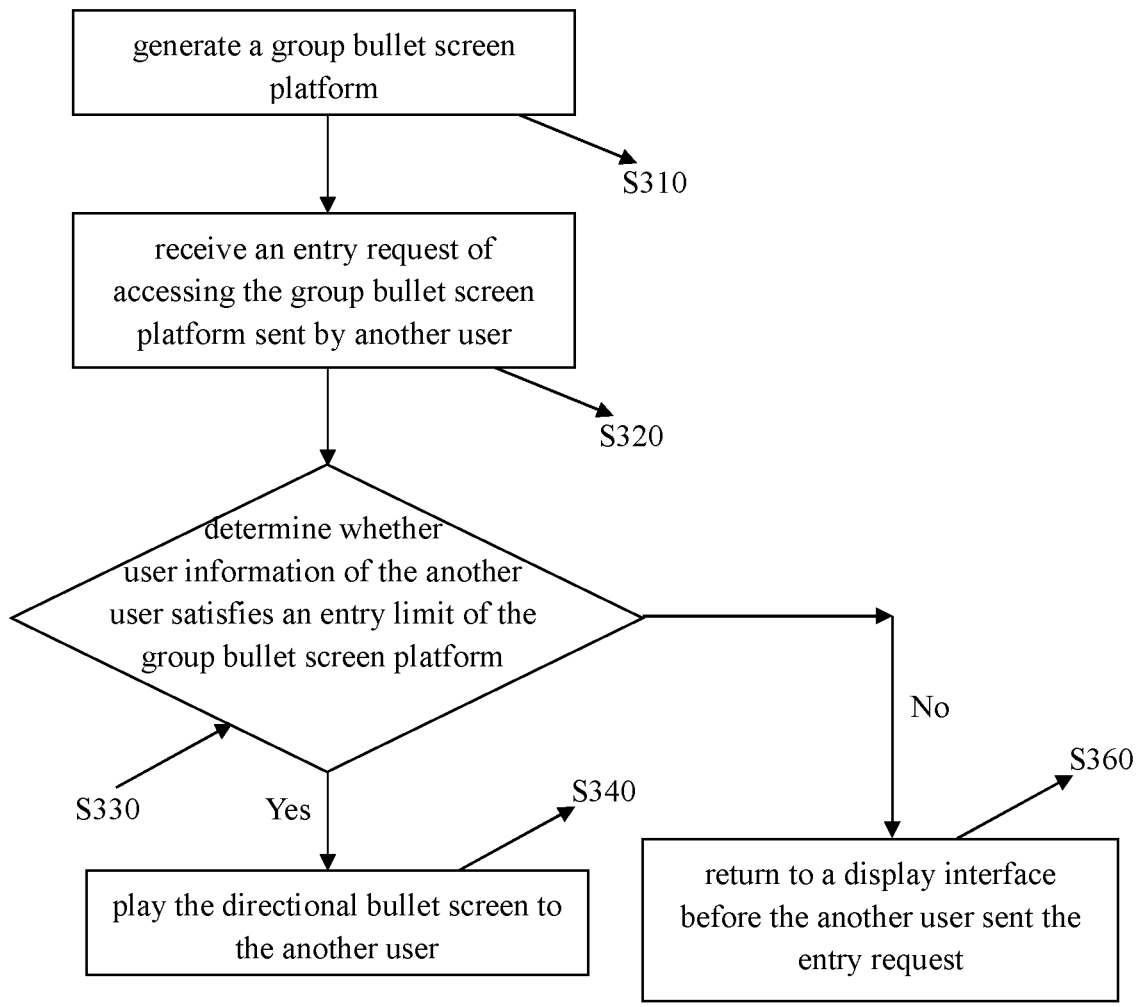
FIG. 7 is a flowchart illustrating an example process of the step S300 that may be used in accordance with the present disclosure.

FIG. 7 is a flowchart illustrating an example process of the step S300 shown in FIG. 4. As shown in FIG. 7, the step S300 of creating a bullet screen platform and playing the objective directional bullet screen to another user entering into the bullet screen platform includes:

S310: creating a group bullet screen platform;

S320: receiving an entry request of entering into the group bullet screen platform sent by another user;

S330: judging whether the user information of the another user satisfies an entry limit of the group bullet screen platform or not;

S340: playing the objective directional bullet screen to the another user if yes, or S360: returning to the display interface before the another user sent the entry request if not.

Through the above steps, the creation of the group bullet screen platform is realized, that is, one user who satisfies the creation condition creates a group bullet screen platform on which a specific group of people can share bullet screen, another user can enter into the group bullet screen platform only when he is permitted by the creating user or his user information satisfies the entry limit preset by the video website operator, once the user enters into the group bullet screen platform, he will receive the objective directional bullet screen, if his user information does not satisfy the entry limit, he will return to the previous interface.

In the above-mentioned creation process, the step S310 of creating a group bullet screen platform includes:

creating the group bullet screen platform;

setting a platform limit of the group bullet screen platform by the creating user, wherein the platform limit can include: the name of the group bullet screen platform, to facilitate other users to enter into the group bullet screen platform by searching, the upper limit of the number of the users entering into the group bullet screen platform, to limit service load or share scope, and the effective time of the group bullet screen platform, to clean up the platform regularly, reduce the management energy of the user, and so on.

Figure 8:
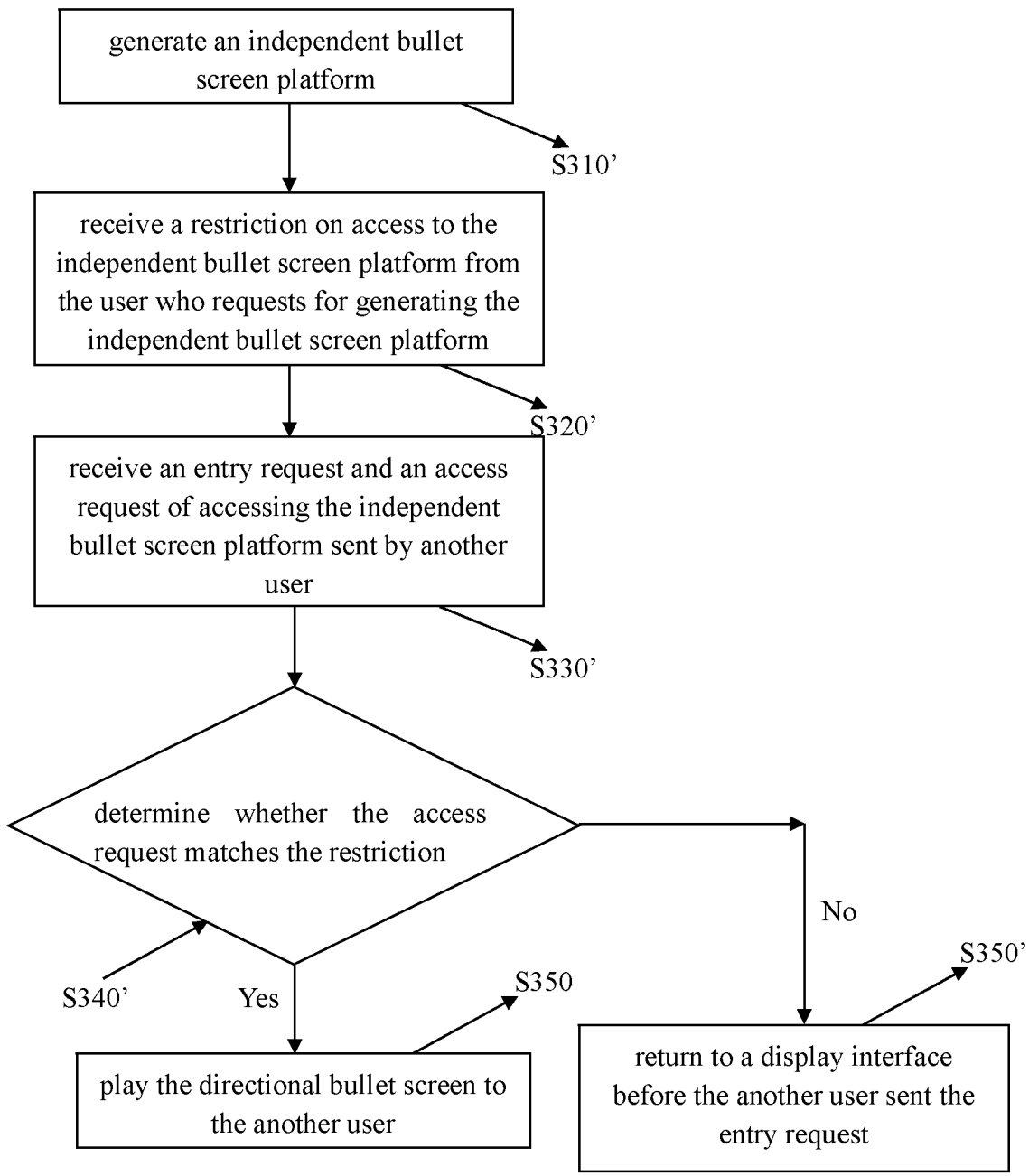
FIG. 8 is a flowchart illustrating another example process of the step S300 that may be used in accordance with the present disclosure.

FIG. 8 is a flowchart illustrating another example process of the step S300. As shown in FIG. 8, the step S300 of creating a bullet screen platform and playing the objective directional bullet screen to another user entering into the bullet screen platform includes:

S310': creating an independent bullet screen platform;

S320': receiving an access limit of entering into the independent bullet screen platform preset by the user creating the independent bullet screen platform;

S330': receiving an entry request and an access request of entering into the independent bullet screen platform sent by the another user;

S340': judging whether the access request matches the access limit or not;

S350: playing the objective directional bullet screen to the another user if yes, or S350': returning to the display interface before the another user sent the entry request if not.

It is different from the previous embodiment that the creation of the independent bullet screen platform is realized, that is, one user who satisfies the creation condition creates an independent bullet screen platform on which a specific group of people can share bullet screen, and into which they can enter only when they are permitted by the creating user, besides the set entry limit, access restrictions such as access code, access registration limit, registration time limit, etc. are further added, other users can enter into the independent bullet screen platform after they are required to input an access request with a password in addition that they satisfy the entry limit, which further guarantees the privacy and subdivides the types of the bullet screen platforms, and, similarly, is capable of enriching the user experience and increasing the user consumption points.

Further, in the above-mentioned embodiment, the step S310' of creating an independent bullet screen platform includes:

creating the independent bullet screen platform;

setting a platform limit of the independent bullet screen platform, wherein the platform limit includes: the name of the independent bullet screen platform, the upper limit of the number the user entering into the independent bullet screen platform and the effective time of the independent bullet screen platform.

In another embodiment, the bullet screen playing control method of the present invention can further comprise the following steps:

obtaining a current resource accessed by the user, such as getting the page that the user is redirected to, the video resource played in the redirected page, etc.

judging whether the user accesses the current resource for the first time or not, such as judging whether the user visits the page for the first time (which can be realized by confirming the IP address), whether the user watches the video resource played in the redirected page for the first time playing open bullet screen to the user if yes, or displaying the bullet screen platform that the user entered into when he accessed the current resource for the last time if not. Through the setting of the step S600, the user's viewing experience can be intelligently and automatically fed back to the created bullet screen platform, such as the group bullet screen platform, the independent bullet screen platform and so on, which reduces the operation process that requires the user himself to operate to feed back the viewing experience, emancipates the user's hands and improves the user's browsing experience.

Furthermore, the bullet screen playing control method of the present invention can further comprise the following steps:

loading the bullet screen platform created previously by the user, to facilitate the user to manage all bullet screen platforms previously created by the user;

obtaining a request of modifying the bullet screen platform of the user, and beginning to require to modify the bullet screen platform;

modifying the platform information of the bullet screen platform, for example, whether the bullet screen platform needs to be kept continuously, modifying the information such as the name, the access limit, the entry limit, etc. of the bullet screen platform. On the one hand, it can optimize the server pressure in the running of the video website, on the other hand, once the bullet screen platform of the creating user leaks, it can be modified timely, to prevent other people from entering into the bullet screen platform maliciously.

The present invention also discloses a server, in which is stored a computer program that is executed by a processor to carry out the steps introduced in the above-mentioned embodiments, therefore it won't be reiterated here additionally.

In addition, the following steps can be carried out according to the features of the server and the user terminal when the bullet screen playing control system constructed based on the server and the user terminal is applied.

the server receiving a creation request of objective directional bullet screen sent by the user terminal;

the server judging whether the user information of the user terminal sending the objective directional bullet screen satisfies a preset creation condition or not;

the server creating a bullet screen platform when the user information satisfies the creation condition, and playing the objective directional bullet screen to another user terminal entering into the bullet screen platform.

Preferably, in the bullet screen playing control method, the step of the step of the server receiving a creation request of objective directional bullet screen sent by the user terminal includes:

the server receiving bullet screen text sent by the user terminal;

the server sending an inquiry to the user terminal that whether the bullet screen corresponding to the bullet screen text needs to be transformed into the objective directional bullet screen or not;

the server receiving an acknowledgement feedback sent by the user terminal responding to the inquiry, and regarding the acknowledgement feedback as the creation request.

Preferably, in the bullet screen playing control method, the step of the step of the server receiving a creation request of objective directional bullet screen includes:

the server receiving a request of creating the bullet screen platform sent by the user terminal;

the server prompting the user terminal to input the objective directional bullet screen that will be displayed on the bullet screen platform;

the server receiving bullet screen text input by the user terminal, and encapsulating the bullet screen text as the objective directional bullet screen.

Preferably, in the bullet screen playing control method, the step of the server judging whether the user information of the user terminal sending the objective directional bullet screen satisfies a preset creation condition or not includes:

presetting the creation condition in the server;

the server extracting the user information of the user terminal, wherein, the user information includes: the account level of the user, the attribute of the user and the platform point of the user;

the server comparing the user information with the creation condition.

Preferably, in the bullet screen playing control method, the step of the server creating a bullet screen platform and playing the objective directional bullet screen to another user terminal entering into the bullet screen platform includes:

the server creating a group bullet screen platform;

the server receiving an entry request of entering into the group bullet screen platform sent the another user terminal;

the server judging whether the user information of the another user terminal satisfies an entry limit of the group bullet screen platform or not;

the server playing the objective directional bullet screen to the another user terminal if yes, or returning to the display interface before the another user terminal sent the entry request if not.

Preferably, in the bullet screen playing control method, the step of the server creating a group bullet screen platform includes:

the server creating the group bullet screen platform;

setting a platform limit of the group bullet screen platform in the server, wherein the platform limit includes: the name of the group bullet screen platform, the upper limit of the number of the user terminals entering into the group bullet screen platform and the effective time of the group bullet screen platform.

Preferably, in the bullet screen playing control method, the step of the server creating a bullet screen platform and playing the objective directional bullet screen to another user terminal entering into the bullet screen platform includes:

the server creating an independent bullet screen platform;

the server receiving an access limit of entering into the independent bullet screen platform preset by the user terminal creating the independent bullet screen platform;

the server receiving an entry request and an access request of entering into the independent bullet screen platform sent by the another user terminal;

the server judging whether the access request matches the access limit or not;

the server playing the objective directional bullet screen to the another user terminal if yes, or returning to the display interface before the another user terminal sent the entry request if not.

Preferably, in the bullet screen playing control method, the step of the server creating an independent bullet screen platform includes:

the server creating the independent bullet screen platform;

setting a platform limit of the independent bullet screen platform in the server, wherein the platform limit includes: the name of the independent bullet screen platform, the upper limit of the number of the users entering into the independent bullet screen platform and the effective time of the independent bullet screen platform.

Preferably, in the bullet screen playing control method, the following steps can be further comprised:

the server obtaining a current resource accessed by the user terminal;

the server judging whether the user terminal accesses the current resource for the first time or not;

the server playing open bullet screen to the user terminal if yes, or displaying the bullet screen platform that the user terminal entered into when it accessed the current resource for the last time if not.

Preferably, in the bullet screen playing control method, the following steps can be further comprised:

the server loading the bullet screen platform created previously by the user terminal;

the server obtaining a request of modifying the bullet screen platform of the user terminal;

the server modifying the platform information of the bullet screen platform.

Hereinafter, the application of the present invention will be introduced in details by referring to the specific embodiments.

Embodiment 1

A user of a video website wants to configure bullet screen played on a video to be received only by other users with the same hobby or common interest, for this, he can send a creation request of objective directional bullet screen to the website by clicking on a group bullet screen platform button or another trigger setting with the same effectiveness on a webpage provided by the video website.

After the creation request is received, the user's information is retrieved from the video website operator's server, for example, whether the user has registered and logged in the website itself or not, whether the registered login account level is LV5 or above or not, whether the registered account has an illegal operation record within such as 90 days or not, and so on.

When the above-mentioned creation conditions are met, the creating user will be prompted that the creation is successful, while the comment section of the video that is currently being viewed will be displayed in another color to distinguish the input differences of the bullet screen text before and after the creation. After the group bullet screen platform is created, the creating user can invite other users to enter into the platform by sharing the website address, or any user can still visit the website that carries the video, but the difference is that when other users who are invited to enter into the group bullet screen platform are watching the video, besides the bullet screen in the played public bullet screen pool, they also can receive comments posted by the creating user or other users who are invited in the same way to enter into the platform. However, for the ordinary users who do not enter into the group bullet screen platform, they will only receive the bullet screen in the played public bullet screen pool when they are watching the same video, and there are no other features.

In addition, in the creation of the group bullet screen platform, an entry limit of the group bullet screen platform can be preset, for example, the registration range of other users who can enter into the group bullet screen platform is LV0-6, their membership attributes need to be registered members, full members, large members, or large annual members, etc. their points in the point system of the website, for example, the moral integrity value is within 0-100, the credit score is within 0-5000, etc. At the same time, in order to receive the joining of more users conveniently, the characteristics of the group bullet screen platform can have no restrictions on the number of visitors, no expiration date once created, and so on.

Of course, it can be understood that other users can also enter into the group bullet screen platform by searching, in this case, the creating user needs to name the group bullet screen platform, for example, a name within 8 characters is adopted to name the group bullet screen platform, which will always be displayed on the front-end of the browsing webpage of the creating user when the group bullet screen platform is created successfully.

In order to stimulate the users to consume, a creation threshold can be set for the personalized service, creating a group bullet screen platform can be charged, for example, 20 and 30 platform currencies should be spent to create a group bullet screen platform, to increase the business income of the video website operator.

Embodiment 2

A user of a video website wants to configure bullet screen played on a video to be received only by other users permitted by him, for this, he can send a creation request of objective directional bullet screen to the website by clicking on an independent bullet screen platform button or another trigger setting with the same effectiveness on a webpage provided by the video website.

After the creation request is received, the user's information is retrieved from the video website operator's server, for example, whether the user has registered and logged in the website itself or not, whether the registered login account level is LV3 or above or not, whether the registered account has an illegal operation record within such as 90 days or not, and so on.

When the above-mentioned creation conditions are met, the creating user will be prompted that the creation is successful, while the comment section of the video that is currently being viewed will be displayed in another color to distinguish the input differences of the bullet screen text before and after the creation. After the independent bullet screen platform is created, the creating user can invite other users to enter into the platform by sharing the website address, or any user can still visit the website that carries the video, but the difference is that when other users who are invited to enter into the independent bullet screen platform visit the website address, they are required to input an access password, if the access password is correct, they are prompted that they have enter into the independent bullet screen platform, when they are watching the video, besides the bullet screen in the played public bullet screen pool, and/or they also can receive comments posted by the creating user or other users who are invited in the same way and permitted by the creating user to enter into the platform. However, for the ordinary users who do not enter into the independent bullet screen platform, or the users whose access password is not correct, it can be configured that they will only receive the bullet screen in the played public bullet screen pool when they are watching the same video, and there are no other features, or that they can not visit the website address, a failure prompt is sent to the user and the browsing interface is returned to the previous browser interface.

In addition, in the creation of the independent bullet screen platform, in order to guarantee more private entry and access of the independent bullet screen platform, the characteristics of the independent bullet screen platform can be any limit to the number of visitors, it can be limited that the independent bullet screen platform can be visited only by, at most, 50, 100, 200, or 500 users, and no new users will be allowed to visit the independent bullet screen platform when the number of visitors reaches the upper limit, according to the creating user's setting. In addition, the effective time begins to be calculated from the creation, it is effective within 7 days, 30 days, 90 days or 365 days, after the effective period, the independent bullet screen platform will be automatically invalidated. At the same time, as a flexible setting, the creating user of the independent bullet screen platform can extend the validity period so as to continue to use it.

Of course, it can be understood that other users can also enter into the independent bullet screen platform by searching, in this case, the creating user needs to name the independent bullet screen platform, for example, a name within 8 or 18 characters is adopted to name the independent bullet screen platform, which is optional to be not displayed on the front-end of the browsing webpage of the creating user, but displayed only on his personal panel or personal information interface when the independent bullet screen platform is created successfully.

In order to stimulate the users to consume, a creation threshold can be set for the personalized service, creating an independent bullet screen platform can be charged, for example, different charges can be set according to the user number that can be accepted by the independent bullet screen platform, the length of the validity period, etc., for example, spending 10 platform currencies can create an independent bullet screen platform with a capacity of 50 users and a validity period of 7 days, spending 150 platform currencies can create an independent bullet screen platform with a capacity of 500 users and a validity period of 365 days. The platform currencies needs to be recharged by the user, for example, each 1 RMB corresponds to a platform currency, etc., so as to increase the business consumption.

In addition, in view of the particularity of the user who has created the independent bullet screen platform, once the independent bullet screen platform is created, in case that the user does not modify the access limit, when the creating user visits the web site address or the video resource again, it is not necessary to input the password again to be authenticated and he can enter into the independent bullet screen platform directly, or it is same for other users who have previously entered into the independent bullet screen platform, which saves many complicated processes of inputting passwords.

In the above-mentioned Embodiment 1 and Embodiment 2, whether the creating user of the group bullet screen platform or the creating user of the independent bullet screen platform, the bullet screen platform can be managed in the personal center, such as modifying the entry condition of the group bullet screen platform, modifying the name of the bullet screen platform, modifying the access limit of the independent bullet screen platform, modifying the access permission, such as specifying that some users can enter directly into the independent bullet screen platform while skipping the access limit, and so on, and it is also optional to set user consumption points for the execution and storage of the above modifications.

It should be noted that the embodiments of the present invention have better practicality, and do not limit in any form on the present invention, any technician familiar with the field may make use of and change or modify the above-disclosed technical contents to equivalent effective embodiments, any modifications or equivalent changes made to the above embodiments according to the technical essence of the present invention, without departing from the content of the technical solutions of the present invention, are still within the scope of the technical solutions of the present invention.

It is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific embodiment or combination of embodiments of the described methods.

The present methods and systems may be understood more readily by reference to the following detailed description of preferred embodiments and the examples included therein and to the Figures and their descriptions.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

What is claimed is:

1. A method for generating and presenting comments relative to video frames among selected users in a network community comprising a server computing device and a plurality of client computing devices, comprising:
   receiving, by the server computing device, message data from a first user, the message data comprising at least one comment on a video;
   determining, by the server computing device, that the at least one comment is restricted to be viewable by a first selected group of users based on an input by the first user;
   determining, by the server computing device, that user information associated with the first user satisfies at least one predetermined condition;
   generating, by the server computing device, a first directional bullet screen based on the message data received from the first user, the first directional bullet screen comprising the at least one comment, context information indicating that the at least one comment is to move across at least one frame of the video, and directional information indicating that the at least one comment is to be presented to and viewable by the first selected group of users only;
   receiving, by the server computing device, at least one restriction on viewing the first directional bullet screen from the first user;
   receiving, by the server computing device, a request of accessing the first directional bullet screen sent from a third user;
   determining, by the server computing device, whether user information associated with the third user satisfies the at least one restriction;
   transmitting, by the server computing device, the first directional bullet screen to the third user based at least in part on determining that the user information associated with the third user satisfies the at least one restriction;
   denying, by the server computing device, the request of accessing the first directional bullet screen and causing a display device used by the third user to return to a previous display interface immediately before the third user sent the request of accessing the first directional bullet screen based in part at least on determining that the user information associated with the third user does not satisfy the at least one restriction;
   transmitting, by the server computing device, the first directional bullet screen to a fifth user who is watching the video based on determining that the fifth user is among the first selected group of users, wherein the at least one comment is displayed by moving across the least one frame of the video based on the context information and is viewed by the fifth user; and transmitting, by the server computing device, a public bullet screen other than the first directional bullet screen to a sixth user who is watching the video based on determining that the sixth user does not belong to the first selected group of users, wherein the public bullet screen comprises a second comment on the video that is viewable by any user and context information indicating that the second comment moves across one or more frames of the video,
   wherein there is an upper limit of a number of the first selected group of users who are allowed to view the first bullet screen;
   wherein the first bullet screen has a valid period after which accessing to the first bullet screen is automatically invalidated; and
   wherein the upper limit of the number of the first selected group of users and the valid period of the first bullet screen are determined based on an amount of platform currency spent by the first user.

2. The method of claim 1, wherein the determining whether user information associated with the first user satisfies at least one predetermined condition further comprises:
   presetting, by the server computing device, the at least one predetermined condition;
   extracting, by the server computing device, the user information associated with the first user, wherein the user information comprises a level of an account of the first user, an attribute of the first user, and a score associated with the first user in the network community; and
   comparing, by the server computing device, the user information associated with the first user with the at least one predetermined condition.

3. The method of claim 1, wherein the generating a first directional bullet screen further comprises:
   generating, by the server computing device, a name for the first directional bullet screen.

4. The method of claim 1, further comprising:
   determining, by the server computing device, whether a fourth user visits the video for a first time or previously visited the video when the fourth user is currently visiting the video;
   transmitting, by the server computing device, the public bullet screen to the fourth user based on determining that the fourth user visits the video for the first time; and
   transmitting, by the server computing device, the first directional bullet screen that the fourth user previously accessed to the video based on determining that the fourth user previously visited the video.

5. The method of claim 1, further comprising:
   loading, by the server computing device, the first directional bullet screen previously generated;
   receiving, by the server computing device, a request of modifying the first directional bullet screen from the first user; and
   modifying information associated with the first directional bullet screen based on the received request.

6. A computing system of generating and presenting comments relative to video frames among selected users in a network community, comprising:
   at least a processor; and
   at least a memory communicatively coupled to the at least a processor to configure the at least a processor to:

receive message data from a first user, the message data comprising at least one comment on a video;
determine that the at least one comment is restricted to be viewable by a first selected group of users based on an input by the first user;
determine that user information associated with the first user satisfies at least one predetermined condition;
generate a first directional bullet screen based on the message data received from the first user, the first directional bullet screen comprising the at least one comment, context information indicating that the at least one comment is to move across at least one frame of the video, and directional information indicating that the at least one comment is to be presented to and viewable by the first selected group of users only;
receive at least one restriction on viewing the first directional bullet screen from the first user;
receive a request of accessing the first directional bullet screen from a third user;
determine whether user information associated with the third user satisfies the at least one restriction;
transmit the first directional bullet screen to the third user based at least in part on determining that the user information associated with the third user satisfies the at least one restriction;
deny the request of accessing the first directional bullet screen by the third user and cause a display device used by the third user to return to a previous display interface immediately before the third user sent the request of accessing the first directional bullet screen based in part at least on determining that the user information associated with the third user does not satisfy the at least one restriction;
transmit the first directional bullet screen to a fifth user who is watching the video based on determining that the fifth user is among the first selected group of users, wherein the at least one comment is displayed by moving across the least one frame of the video based on the context information and is viewed by the fifth user; and
transmit a public bullet screen other than the first directional bullet screen to a sixth user who is watching the video based on determining that the sixth user does not belong to the first selected group of users, wherein the public bullet screen comprises a second comment on the video that is viewable by any user and context information indicating that the second comment moves across one or more frames of the video;
wherein there is an upper limit of a number of the first selected group of users who are allowed to view the first bullet screen;
wherein the first bullet screen has a valid period after which accessing to the first bullet screen is automatically invalidated; and
wherein the upper limit of the number of the first selected group of users and the valid period of the first bullet screen are determined based on an amount of platform currency spent by the first user.

7. The computing system of claim 6, wherein the determining whether user information associated with the first user satisfies at least one predetermined condition further comprises: presetting, by the server computing device, the at least one predetermined condition; extracting, by the server computing device, the user information associated with the first user, wherein the user information comprises a level of an account of the first user, an attribute of the first user, and a score associated with the first user in the network community; and comparing, by the server computing device, the user information associated with the first user with the at least one predetermined condition.

8. The computing system of claim 6, wherein generating a first directional bullet screen further comprises:
generating a name for the first directional bullet screen.

9. The computing system of claim 6, the at least a memory further configuring the at least a processor to:
determine whether a fourth user visits the video for a first time or previously visited the video when the fourth user is currently visiting the video;
transmit the public bullet screen to the fourth user based on determining that the fourth user visits the video for the first time; and
transmit the first directional bullet screen that the fourth user previously accessed to the video based on determining that the fourth user previously visited the video.

10. The computing system of claim 6, the at least a memory further configuring the at least a processor to:
receive a request of modifying the first directional bullet screen from the first user;
load the first directional bullet screen that was previously generated; and
modify information associated with the first directional bullet screen based on the received request.

11. A non-transitory computer-readable storage medium bearing computer-readable instructions that upon execution on a computing device cause the computing device at least to:
receive message data from a first user, the message data comprising at least one comment on a video;
determine that the at least one comment is restricted to be viewable by a first selected group of users based on an input by the first user;
determine that user information associated with the first user satisfies at least one predetermined condition;
generate a first directional bullet screen based on the message data received from the first user, the first directional bullet screen comprising the at least one comment, context information indicating that the at least one comment is to move across at least one frame of the video, and directional information indicating that the at least one comment is to be presented to and viewable by the first selected group of users only;
receive at least one restriction on viewing the first directional bullet screen from the first user;
receive a request of accessing the first directional bullet screen from a third user;
determine whether user information associated with the third user satisfies the at least one restriction;
transmit the first directional bullet screen to the third user based at least in part on determining that the user information associated with the third user satisfies the at least one restriction;
deny the request of accessing the first directional bullet screen by the third user and cause a display device used by the third user to return to a previous display interface immediately before the third user sent the request of accessing the first directional bullet screen based in part at least on determining that the user information associated with the third user does not satisfy the at least one restriction;
transmit the first directional bullet screen to a fifth user who is watching the video based on determining that the fifth user is among the first selected group of users, wherein the at least one comment is displayed by moving across the least one frame of the video based on the context information and is viewed by the fifth user; and transmit a public bullet screen other than the first directional bullet screen to a sixth user who is watching the video based on determining that the sixth user does not belong to the first selected group of users, wherein the public bullet screen comprises a second comment on the video that is viewable by any user and context information indicating that the second comment moves across one or more frames of the video;

wherein there is an upper limit of a number of the first selected group of users who are allowed to view the first bullet screen;

wherein the first bullet screen has a valid period after which accessing to the first bullet screen is automatically invalidated; and wherein the upper limit of the number of the first selected group of users and the valid period of the first bullet screen are determined based on an amount of platform currency spent by the first user.

12. The non-transitory computer-readable storage medium of claim 11, wherein computer-readable instructions that upon execution cause the computing device to generate a first directional bullet screen further comprise computer-readable instructions that upon execution on the computing device cause the computing device at least to:

generate a name for the first directional bullet screen.

* * * * *